United States Patent [19]

Johnson

[11] Patent Number: 5,443,053
[45] Date of Patent: Aug. 22, 1995

[54] FUEL HEATER

[76] Inventor: Jack E. Johnson, 2808 27th St. S., Grand Forks, N. Dak. 58103

[21] Appl. No.: 97,702

[22] Filed: Jul. 27, 1993

[51] Int. Cl.$^6$ ............................................. F02M 31/00
[52] U.S. Cl. ................................................. 123/557
[58] Field of Search ............... 123/557, 552, 553, 543, 123/545, 546, 547, 549

[56] References Cited

U.S. PATENT DOCUMENTS

| | | |
|---|---|---|
| 1,926,342 | 9/1930 | Lippencott . |
| 3,253,647 | 5/1966 | Deshaies . |
| 3,524,734 | 8/1970 | Kamiryo et al. . |
| 3,989,019 | 11/1976 | Brandt et al. . |
| 4,114,566 | 9/1978 | Harpman et al. ................. 123/552 |
| 4,286,551 | 9/1981 | Blitz . |
| 4,289,095 | 9/1981 | Scherr . |
| 4,326,491 | 4/1982 | Burchett . |
| 4,326,492 | 4/1982 | Leibrand et al. ................. 123/553 |
| 4,347,894 | 9/1982 | Gerlach . |
| 4,349,950 | 9/1982 | Bowden . |
| 4,388,910 | 6/1983 | Birswell .......................... 123/547 |
| 4,393,851 | 7/1983 | Gorans . |
| 4,401,091 | 8/1983 | Costello et al. . |
| 4,424,776 | 1/1984 | Allen . |
| 4,515,135 | 5/1985 | Glass ............................... 123/557 |
| 4,516,556 | 5/1985 | Meyer . |
| 4,571,481 | 2/1986 | Leary .............................. 123/549 |
| 4,591,691 | 5/1986 | Badali . |
| 4,612,897 | 9/1986 | Davis . |
| 4,700,047 | 10/1987 | Crossett et al. . |
| 4,711,223 | 12/1987 | Carroll . |
| 4,723,065 | 2/1988 | Meyer . |
| 4,748,961 | 6/1988 | Headley et al. ................... 123/557 |
| 4,790,285 | 12/1988 | Wolf . |
| 4,841,943 | 6/1989 | Favreau et al. . |
| 4,858,584 | 8/1989 | Bridgeman . |
| 4,933,077 | 6/1990 | Wolf . |
| 4,944,343 | 7/1990 | Muller . |
| 4,979,483 | 12/1990 | Ray . |
| 4,984,555 | 1/1991 | Huang . |

Primary Examiner—Marguerite Macy
Attorney, Agent, or Firm—Jerold M. Forsberg

[57] ABSTRACT

A fuel heater for improving the fluidity of fuel, vaporization of fuel, and combustion of fuel to thereby minimize emissions and maximize power output for an engine includes a chamber in which a manifold is disposed such that a heat exchanger can extend therearound. The manifold includes openings for introducing fluid medium into the chamber which open in different directions thereby creating a more uniform turbulence in the chamber and enhancing the transfer of heat to the fuel. The arrangement of the manifold and heat exchanger increases the amount of heated fluid medium which comes into contact with the heat exchanger by overcoming the effect of boundary layers. The fuel heater includes a fuel mixing chamber and a fluid medium reservoir which are utilized to control the temperature of fluid medium entering the chamber and, accordingly, the temperature of fuel exiting the heater. The fuel heater includes various arrangements for providing heat to the fuel heater and control arrangements therefore.

33 Claims, 4 Drawing Sheets

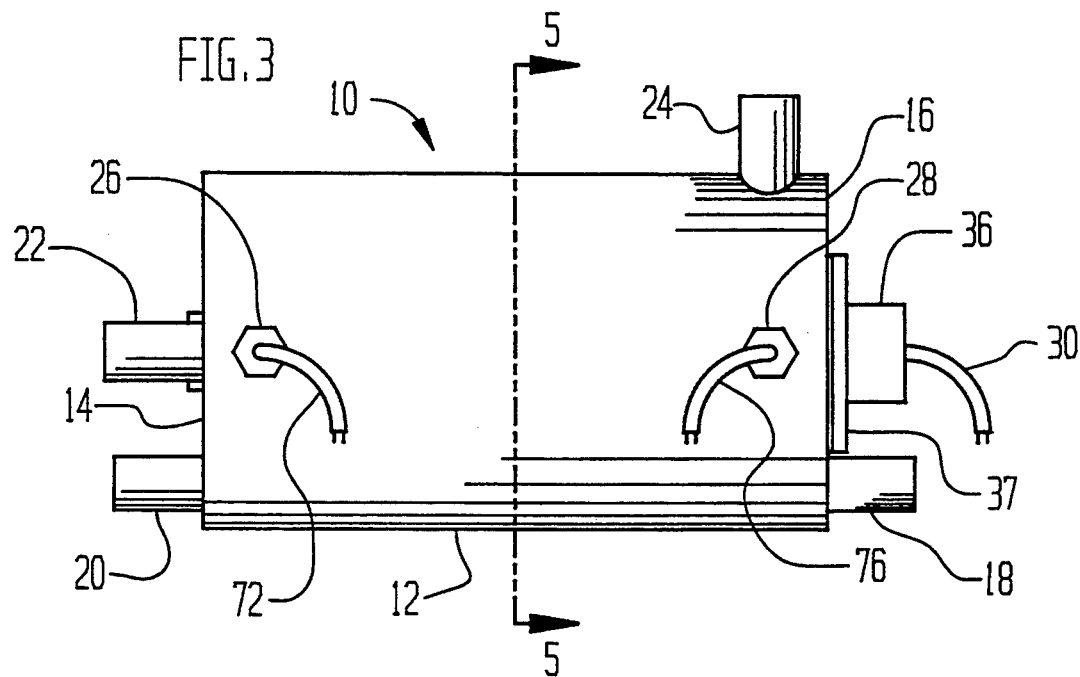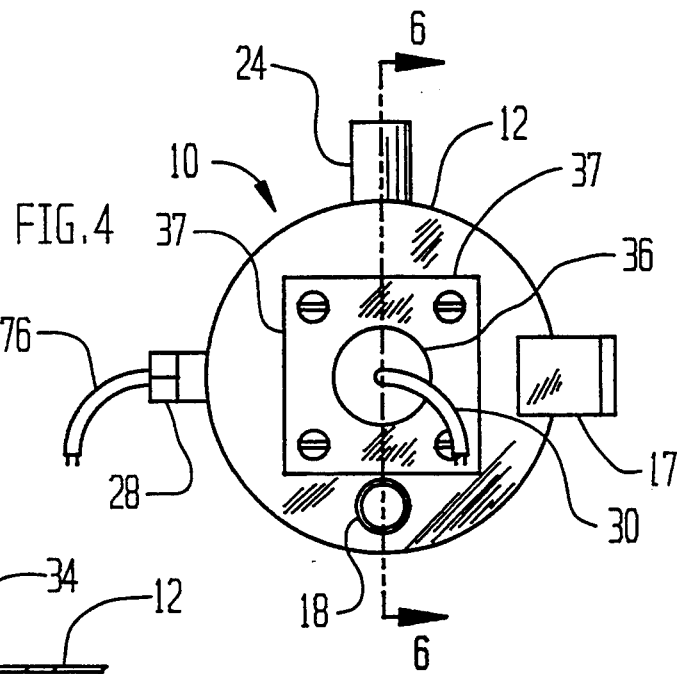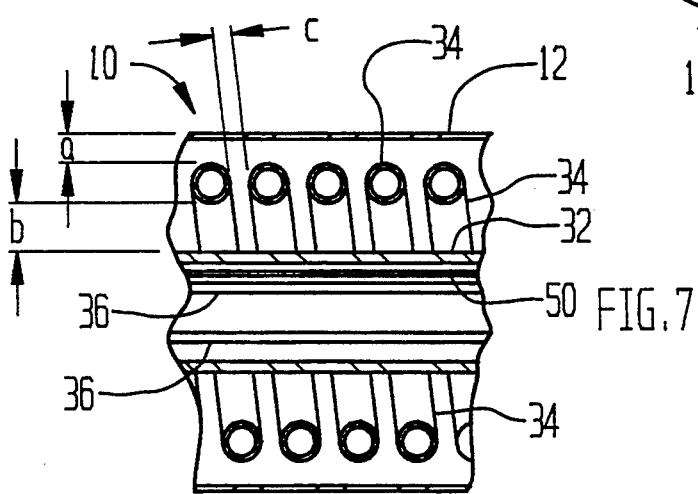

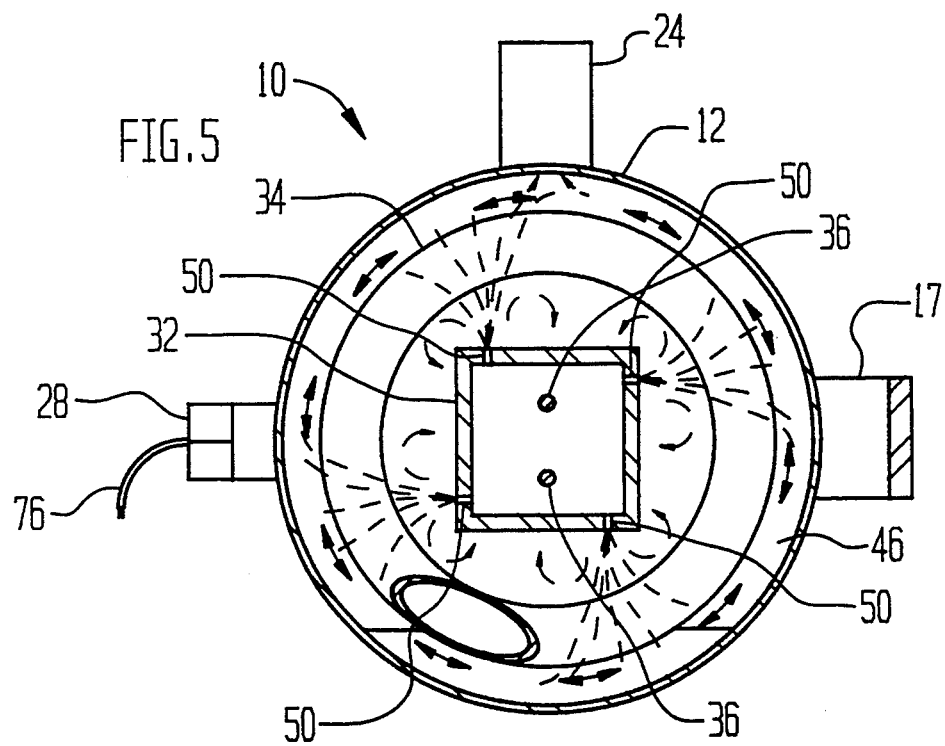
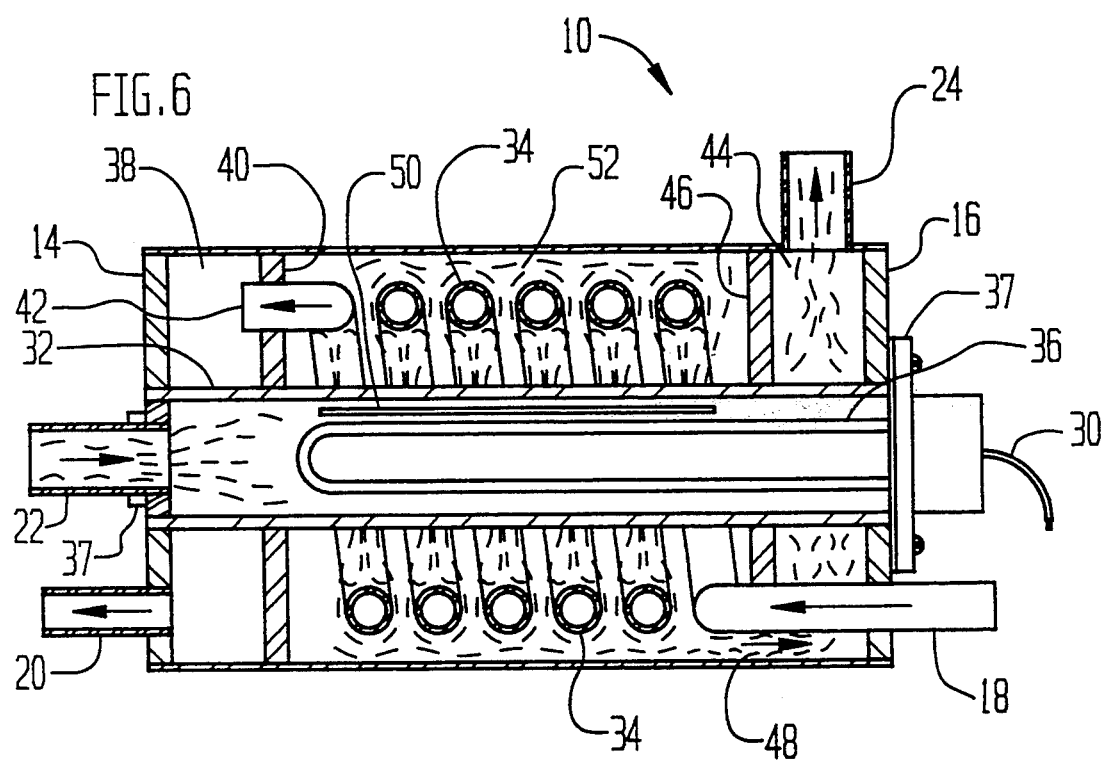

FUEL HEATER

FIELD OF THE INVENTION

The present invention relates to a heater for fuel and more particularly to a heater for heating diesel fuel to improve: the fluidity of the fuel and ensure movement of the fuel through a fuel delivery system for an engine; the vaporization of the fuel just prior to combustion of the fuel in an engine; and the combustion of the fuel in an engine to minimize exhaust emissions and increase engine power output. The fuel heater of the instant invention can also be used to keep fuel in a fuel delivery system for an engine warm during cold weather and to keep an engine warm when it is not running.

BACKGROUND OF THE INVENTION

Diesel engines and equipment which use diesel fuel are, in many cases, preferred to machinery which use other types of fuel, e.g., trucks and boats used to haul freight are more often then not powered by diesel engines. Even though diesel engines are common, and have been common for many years, there continues to be problems with delivery, storage, and the optimized usage of diesel fuel in addition to problems with maximizing the efficiency of the diesel engine. Standard practice is to use No. 2 diesel fuel with diesel type internal combustion engines when ambient atmospheric temperatures are above about 10 degrees Fahrenheit and No. 1 diesel fuel when temperatures are below 10 degrees Fahrenheit. No. 2 grade diesel is the preferred fuel because it burns more efficiently than No. 1 grade, resulting in better engine performance. The particular problems with No. 2 grade diesel fuel include waxing or gelling of the fuel when atmospheric temperatures are below approximately 10 degrees Fahrenheit, which results in difficulty in starting cold engines, and less than complete combustion of the fuel, which in turn results in decreased engine efficiency and increased exhaust emissions. These problems stem from the fact that No. 2 grade diesel fuel has long chain hydrocarbons and waxes which form molecules that become progressively larger as temperatures decrease until the fuel will actually gell and wax at approximately 10 degrees Fahrenheit. Even when diesel fuel appears to be flowing readily, the hydrocarbon chains may be relatively long. Consequently, when the fuel is injected into the combustion chambers in the engine, the atomization of the fuel may be limited resulting in incomplete burning thereof.

Accordingly, it is known that preheating diesel fuel to prevent gelling and waxing by utilizing heated engine coolant and electric heaters and combining the preheater for the fuel with the engine coolant system will keep the engine warm during periods when the engine is not being used. It is also known that preheating aviation fuel prior to combustion in an engine will improve the burning characteristics of the fuel as well as heating diesel fuel as it enters a water separator will facilitate separating water from the fuel. Other prior art arrangements have dealt with control systems for controlling the flow of the engine coolant and energization of electric heaters, which may either be 12 volt or 120 volt. In some cases there has been a problem with direct contact of the diesel fuel with an electric heater and attempts to avoid this problem have resulted in arrangements which usually are complex and ultimately expensive to manufacture and maintain. It has also been found that fuel heaters which use engine coolant as a heat source and rely on a helical tube or tubing matrix of some arrangement within a chamber filled with heated engine coolant are usually inconsistent and heat fuel to substantially varying temperatures prior to the fuel exiting from the apparatus.

Many of these noted teachings are depicted and taught in some detail in the U.S. patents listed on the information disclosure form submitted simultaneously with this application. None of these prior art devices deals with the heating of fuel to a predetermined temperature range, which is close to the vaporization point for diesel fuel, or combines answers to the problems with delivery of fuel in a consistent manner in addition to keeping fuel warm and the engine warm during periods of non-use in a single device.

Accordingly, there exists a need for effective and economical solutions to the inherent problems of using diesel fuel, especially No. 2 grade diesel, with diesel type internal combustion engines.

SUMMARY OF THE INVENTION

According to the present invention, a fuel heater includes a chamber for receiving fluid medium from an engine; a manifold centrally disposed along the longitudinal axis of the chamber; a generally helical heat exchanger for controlling the passage of fuel through the chamber; a reservoir for mixing fuel exiting from the heat exchanger; a reservoir for mixing fluid medium exiting the chamber where the fluid medium is introduced; and a control system which includes an electric heater, an in-line fuel pump, an in-line fluid medium pump, a fluid temperature sensor, and a fuel temperature sensor for optimizing usage of the fuel heater with an engine. The helical heat exchanger is disposed around the manifold and the manifold includes slots through which fluid medium is introduced to the fluid medium chamber at a flow rate determined to induce moderate turbulence in fluid medium in the fluid medium chamber. The manifold and the helical heat exchanger are particularly positioned relative to each other and to the fluid medium chamber in order to maximize the transfer of heat from the fluid medium to the fuel. It is contemplated that the flow of fluid medium through the fuel heater can be controlled and that it can be controlled either manually or automatically. Accordingly, a valve in the fluid medium return line controls the flow rate of fluid medium through the fuel heater and is either responsive to manual control or to automatic control. The electric heater extends into the manifold and is responsive to the control system for heating the fluid medium when the temperature of the fluid medium is insufficient to heat the fuel in the heat exchanger to a desired predetermined temperature range. The electric heater also cooperates with the in-line fluid medium pump and the in-line fuel pump to be automatically responsive to the fluid medium temperature sensor to keep the engine and fuel warm when the engine is not running.

Accordingly, it is an object of the present invention to provide a fuel heater which will heat fuel to a predetermined temperature range.

It is another object of the instant invention to provide a fuel heater for a diesel engine which will supply the engine with fuel heated to a predetermined temperature range.

Yet another object of the invention is to provide a fuel heater which will supply fuel heated to a temperature within a predetermined temperature range to a diesel engine while it is operating and which will maintain the fuel and engine in a warm condition when the engine is not operating.

Another object of this invention is to provide a fuel heater and fluid medium heater which will assist a diesel engine in maximizing the efficiency with which it utilizes fuel being supplied thereto.

It is a further object of the instant invention to provide a control system for a fuel heater.

It is yet another object of this invention to provide a control system for a fuel heater which utilizes mixing reservoirs for monitoring and controlling the temperature of fluid medium and fuel as they pass through the fuel heater.

It is also an object of this invention to provide a fuel heater which overcomes the problems of fuel heaters in the past and to develop a fuel heater which is efficient and economical.

Other objects and advantages of the present invention will be apparent and understood from the following detailed description when taken in conjunction with the accompanying drawings.

BRIEF DESCRIPTION OF THE DRAWINGS

FIG. 3 is a side elevation view of the fuel heater depicted in FIG. 1;

FIG. 4 is an end elevation view of the fuel heater depicted in FIG. 1;

FIG. 5 is a cross sectional view of the fuel heater depicted in FIG. 1 taken along section line 5—5 in FIG. 3;

FIG. 6 is a cross sectional view of the fuel heater depicted in FIG. 1 taken along section line 6—6 in FIG. 4; and FIG. 7 is a partial cross sectional view showing the heat exchanger location relative to the manifold and chamber.

DETAILED DESCRIPTION OF THE PREFERRED EMBODIMENT

Figure 1:
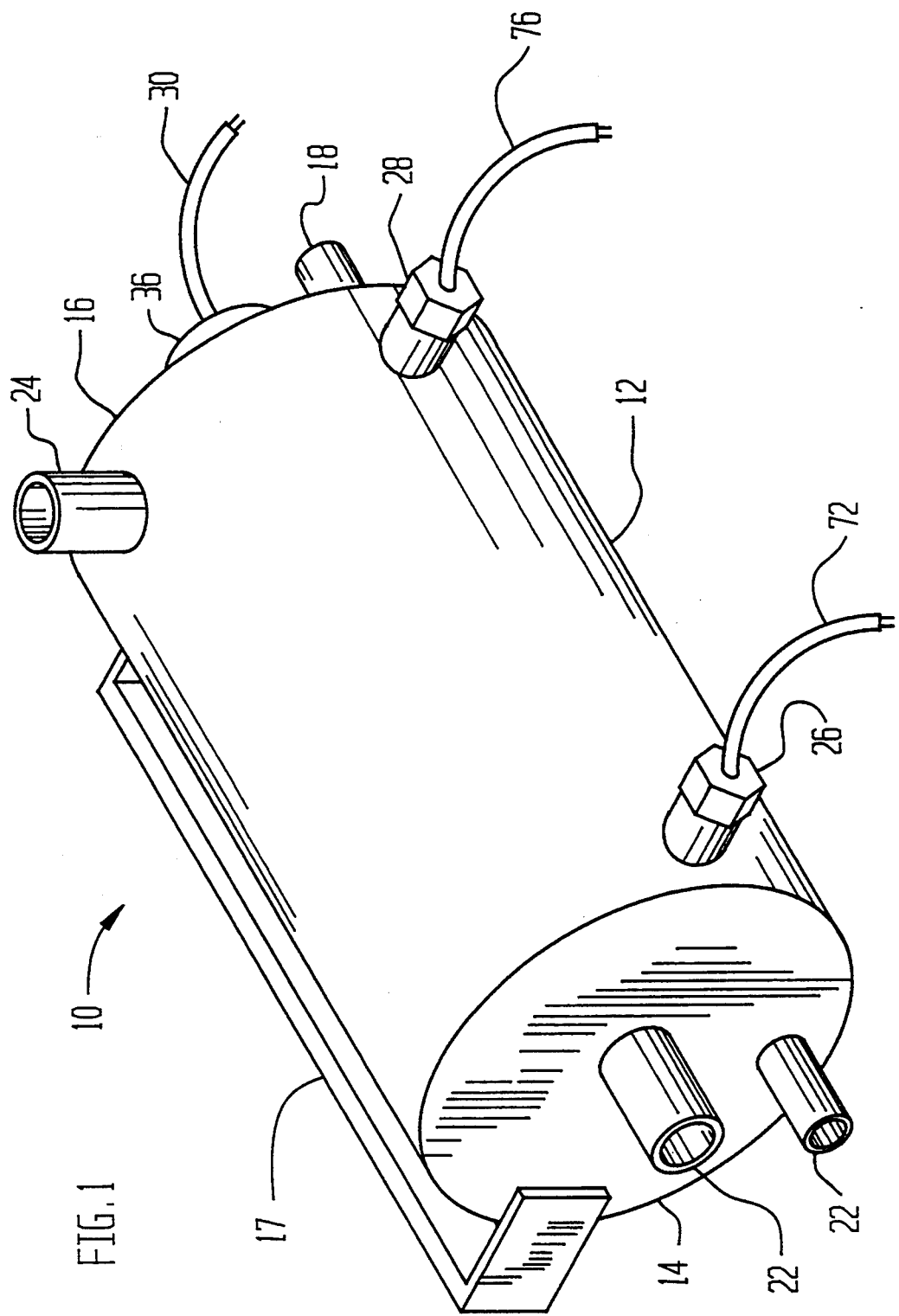
FIG. 1 is an isometric view of a fuel heater constructed in accordance with the principals of the present invention.

Reference herein below is made to the drawings wherein like reference numerals have been employed to designate the same or similar components throughout the various views.

The underlying goal in the development of the fuel heater described herein is to be able to supply diesel fuel that has been heated to a temperature which is within a predetermined temperature range to a diesel type internal combustion engine when it is running, in addition to being able to keep the engine and fuel warm during periods when the engine is not running. Research has determined that No. 2 grade diesel fuel heated to between 158 degrees Fahrenheit, i.e., the temperature at which the long chain hydrocarbons in the fuel begin to breakdown, and the temperature at which the diesel fuel begins to vaporize, i.e., about 193 degrees Fahrenheit, permits optimum usage of the fuel by a diesel type internal combustion engine. Particularly optimized are: the fluidity of the fuel to ensure movement of the fuel through a fuel delivery system for the engine; the vaporization of the fuel just prior to combustion of the fuel in the engine; and the combustion of the fuel in the engine to thereby minimize exhaust emissions and maximize power output.

Referring now to FIGS. 1, 3, and 4, fuel heater 10 includes a cylindrical outer wall 12 with end walls 14 and 16 and a mounting bracket 17. Extending outwardly from the walls 12, 14, and 16 are fuel inlet 18, fuel outlet 20, fluid medium inlet 22, and fluid medium outlet 24. A fuel temperature sensor 26 and fluid medium temperature sensor 28 are disposed near opposite ends of the fuel heater 10, respectively. The importance of the positioning of the inlets and outlets and sensors will become more apparent from a further understanding of the invention. Electrical supply line 30 is connected to an electric heater (discussed below).

As best seen in FIGS. 5 and 6, fluid medium manifold 32 extends from end wall 14 generally along the longitudinal axis of the fuel heater 10 toward end wall 16 and is in direct communication with fluid medium inlet 22. Heat exchanger 34, which is tubular and generally helical, is disposed around manifold 32 and is concentrically disposed relative to the longitudinal axis noted above. Electric immersion heater 36 extends into manifold 32 from end wall 16 and is removably mounted by plate 37. The particular positioning of the heat exchanger 34 relative to the outer cylindrical wall 12 and manifold 32 will be discussed in detail later.

Again referring to FIGS. 5 and 6, the interior of the fuel heater 10 is arranged to include a discrete fuel mixing reservoir 38 defined by division wall 40 and a fluid medium mixing reservoir 44 defined by partition wall 46. Partition wall 46 includes an opening 48 through which fluid medium enters fluid medium mixing reservoir 44. Fuel inlet 18, which is the inlet for the heat exchanger 34, extends through the opening 48, through end wall 14, and is sealed relative to end wall 14. Outlet end 42 of heat exchanger 34 extends through the division wall 40, into the fuel mixing reservoir 38, and is sealed relative to wall 40. Manifold 32, as best seen in FIG. 5, includes slots 50 therein for the introduction of fluid medium into a fluid medium chamber 52 defined by division wall 40 and partition wall 46. Accordingly, fluid medium from engine 54 enters manifold 32 through the fluid medium inlet 22 and from there is dispersed through slots 50 into the fluid medium chamber 52. After fluid medium is introduced into the fluid medium chamber 52 and circulated around the heat exchanger 34, it passes through opening 48 into the fluid medium mixing reservoir 44 from which it then exits through fluid medium outlet 24 to return to engine 54. Fuel enters the heat exchanger 34 through the fuel inlet 18 and cycles through the helical heat exchanger 34 disposed around manifold 32 until it exits through outlet end 42 into fuel mixing reservoir 38. After mixing in fuel mixing reservoir 38 the heated fuel then exits through fuel outlet 20 to be distributed, as needed, to the engine with the unused portion returning to storage.

As best understood from FIGS. 5 and 6, fuel temperature is monitored in the fuel mixing reservoir 38 wherein variations in the temperature of fuel coming from the heat exchanger 34 are substantially eliminated by the fuel being mixed therein. The same concept is employed for the fluid medium reservoir 44 wherein fluid medium is mixed to eliminate periodic variations in temperature. The reservoirs 38 and 44 are for the purpose of obtaining a more consistent average temperature to thereby eliminate periodic fluctuations which may vary significantly from the desired predetermined temperature ranges and the positioning of the sensors and outlets maximizes this effect. Both sensors 26 and 28 and outlets 20 and 24 are positioned to be most effective after as much mixing as possible has occurred in the reservoirs.

Referring now to FIG. 7, an optimum position is depicted for the helical heat exchanger 34 relative to the inside of cylindrical outer wall 12 and the manifold 32, which results in an optimized transfer of heat from fluid medium to fuel as fluid medium and fuel pass through fuel heater 10. Heat exchanger 34 is located within the fluid medium chamber 52 such that: the outermost portion of the tubing from which the heat exchanger coil is made is spaced a distance "a", which is a ratio of 0.50 to 0.75 times the outside diameter of the tube, from the inside surface of the cylindrical outer wall 12; the innermost portion of the tubing from which the heat exchanger coil is made is spaced a distance "b", which is a ratio of 1.65 to 2.00 times the outside diameter of the tube, from the outside surface of the fluid medium manifold 32; and the distance between each juxtaposed laterally disposed helical portion of the heat exchanger 34 is spaced a distance "c", which is a ratio of 0.375 to 0.500 times the outside diameter of the tube from which the helical heat exchanger is formed. Equally as important as the careful positioning of the helical heat exchanger 34, for optimum transfer of heat from heated fluid medium to fuel as fuel and fluid medium pass through fuel heater 10, is the flow rate of the fluid medium as it is introduced into the fluid medium chamber. The flow rate is determined by the size of the slots 50 and the pressure at which the fluid medium enters the manifold and ideally is introduced with sufficient flow rate to create moderate turbulence within the fluid medium chamber 52. Accordingly, it has been found that too slow a flow rate creates a laminar flow pattern and boundary layers are formed around heat exchanger 34 resulting in poor heat transfer, and too high a flow rate causes the fuel to foam which also results in poor heat transfer. As best seen in the cross sectional views, i.e., FIGS. 5 and 6, the arrows generally depict a desired flow pattern for fluid medium which is introduced in the manner being taught herein. As an example, a fluid medium pressure of 100 psi at the fluid medium inlet 22 is ideally reduced to an introduction pressure of approximately 10 psi by sizing the slots appropriately. It should be understood that if the pump for the selected fluid medium circulating system is mechanically driven, the fluid medium flow rate at the fluid medium inlet 22 will vary depending on engine speed and pump rate. Accordingly, some compromise as to the size of the slots is necessary to obtain an overall solution, but moderate turbulence of the heated fluid medium in the fluid medium chamber when the engine is running is the desired end result for optimizing heat transfer.

Figure 2:
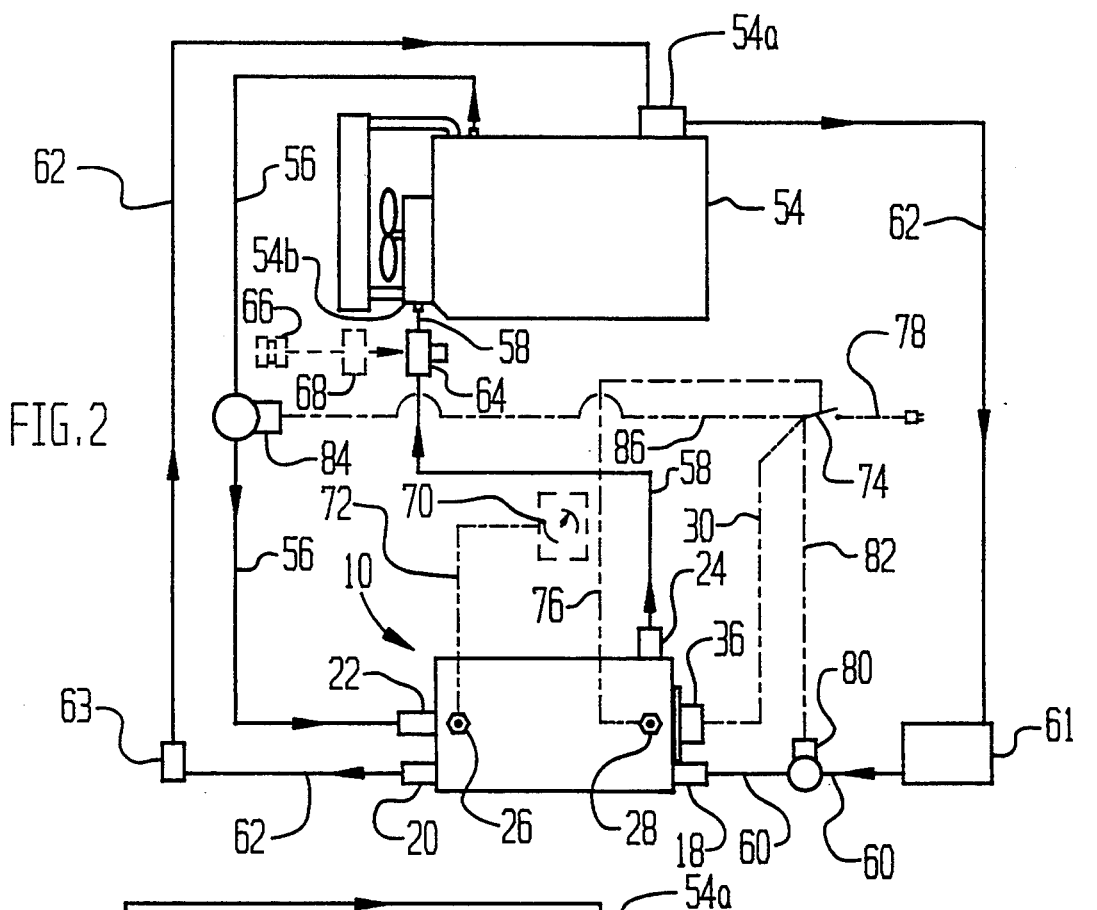
FIG. 2 is a schematic diagram showing the heat exchanger depicted in FIG. 1 connected to an internal combustion engine by a manually controllable control system.
Figure 2A:
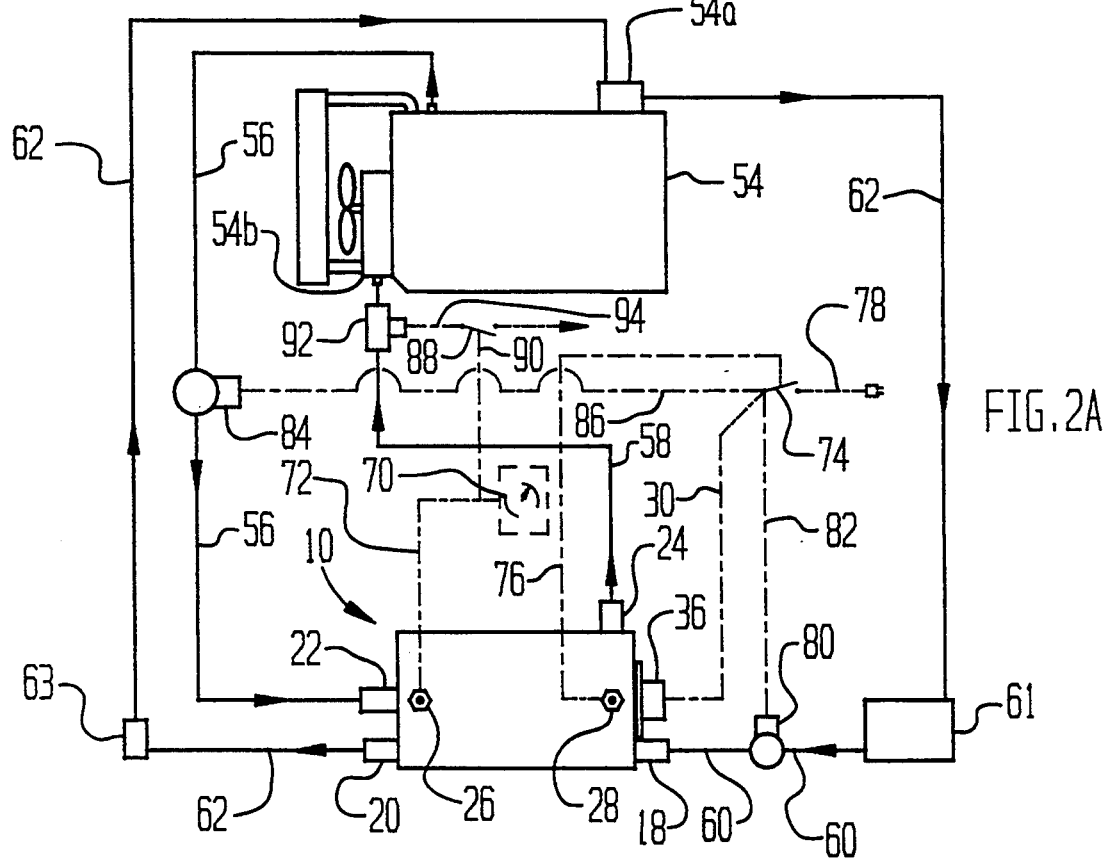
FIG. 2A is a schematic diagram similar to FIG. 2 showing the heat exchanger depicted in FIG. 1 connected to an internal combustion engine by an automatically controlled control system.

FIGS. 2 and 2A illustrate the use of heat exchanger 10 in connection with a diesel type internal combustion engine 54. Engine 54 typically has a fuel pump 54a for pumping fuel through a fuel system, a coolant pump 54b for circulating engine coolant through a coolant system, and a lubricating pump for circulating lubricant through a lubrication system (none of which are shown in detail). It should be noted at this point that the use of either the engine lubricating system or the engine cooling system as a source for heated fluid medium for heating the fuel prior to delivery of the fuel to the engine is contemplated herein. Either system will supply substantial amounts of heat for the fuel heater 18 and, when the engine is running, will usually be supplying most of the energy necessary to heat the fuel. However, there are times and situations where secondary heat sources, such as electrical immersion heaters, are necessary to heat the fluid medium which in turn heats the fuel.

In FIG. 2, the fluid medium chamber 52 and fluid medium mixing reservoir 44 of fuel heater 10 are connected by fluid medium supply line 56 and fluid medium return line 58, respectively, to a fluid medium circulating system for engine 54. Heat exchanger 34 and fuel mixing reservoir 38 of fuel heater 10 are connected by fuel supply line 60 to fuel tank 61 and by fuel return line 62 to fuel filter 63, respectively. Fuel return line 62 continues from filter 63 to engine 54 where fuel is distributed to the engine cylinders as needed, with unused fuel returned to fuel tank 61 by a continuation of return line 62. A manually controllable fluid medium modulating valve 64 is included in the fluid medium return line 58 and can be controlled by a common crank wheel 66 disposed at an operator location. If an electrically controlled fluid medium modulating valve is used, the crank wheel is interconnected to the valve by a unit 68 which transforms mechanical input signals to electrical output signals. A temperature gauge 70, located at the control panel in the vehicle, is connected to fuel temperature sensor 26 by electric line 72 for indicating the sensed temperature 14 of fuel in the fuel mixing reservoir 38. Accordingly, the engine operator can monitor fuel temperature using the temperature gauge and make adjustments using the crank wheel to change the flow rate of the fluid medium to thereby either increase or decrease the temperature of the fuel.

In the embodiment for control shown in FIG. 2, components are included to facilitate usage of the fuel heater 10 to keep the fuel and the engine 54 warm when the engine is not running. A relay 74, which is responsive to output signals from fluid medium sensor 28, is connected to the sensor by line 76. Relay 74, when actuated, connects an electrical supply available through line 78, e.g., either 12 volt current from batteries or 115 volt current from an independent source, to an in-line fuel pump 80 by way of line 82, to an in-line fluid medium pump 84 by way of line 86, and to the electric immersion heater 36 by way of line 30. When the engine is not running, and the electrical supply is 115 volt, the fluid medium sensor, which is typically preset to a predetermined temperature range which may be substantially less than the optimum range of 158 to 192 degrees Fahrenheit, e.g., between 140 and 170 degrees Fahrenheit, will actuate the relay 74 which in turn will actuate the immersion heater and pumps in order to keep the engine and fuel system warm. If the electrical supply is 12 volts, and comes from batteries transported with the fuel heater, it is contemplated that the relay 74 can, when needed, energize the electric heater 36 to assist the engine 54 in heating the fluid medium to the optimum temperature range used for heating the fuel when the engine is running, i.e., 158 to 192 degrees Fahrenheit. It is possible to use all 12 volt components in the instant arrangement and incorporate a converter to permit the use of a 115 volt source. When the immersion heater is utilized to assist the engine in heating the fluid medium, appropriate circuitry is required to sense that the engine is running and that the optimum temperature for the fuel, i.e., 158 to 192 degrees Fahrenheit, is to be used.

The embodiment for control depicted in FIG. 2A is for fully automated control of the manner in which fuel heater 10 is used with an engine and includes the same components as the embodiment in FIG. 2 except that the manually actuatable crank wheel 66 and accompanying unit 68 and valve 64 are replaced by automatic controls. The automatic controls include a relay 88 responsive to output signals from temperature sensor 26 which senses a predetermined fuel temperature range. Relay 88 connects battery power from batteries transported with the engine 54 to actuate a fluid medium modulating valve 92 by way of line 94. Valve 92 can be a controllable valve capable of being partially opened and relay 88 can have control circuitry associated therewith to effect partial opening of valve 92 to more precisely control the flow of fluid medium through fuel heater 10. The portion of the system which is the same as the one depicted in FIG. 2, i.e., the control of the electric heater and pumps, functions in the same manner as previously noted. Accordingly, a fully automatic control, as depicted in FIG. 2A, will deliver fuel at a more constant temperature for use by the engine when the engine is running.

It is the compact and efficient manner in which the fuel heater of the instant invention heats the fuel for an engine, in addition to the manner in which the system can be used to keep an engine and fuel system warm that is novel. The inclusion of a fuel mixing reservoir and a fluid medium mixing reservoir, where the temperatures of the fluid medium and fuel are monitored, results in a much more accurate control system for the delivery of heated fuel to an engine for use therein. Accordingly, this system optimizes the use of the fuel by the engine by being able to supply fuel within a predetermined temperature range to the engine.

It is contemplated that the fuel heater of the instant invention may prove to be valuable in use with equipment other than diesel engines, e.g., high efficiency fuel oil furnaces, and would require appropriate adaption.

While this invention has been described with a certain degree of particularity, it is manifest that many changes may be made in the details of construction and in the arrangement of components without departing from the spirit and scope of the disclosure. It is understood that the invention is not limited to the embodiment set forth herein for purposes of exemplification, but is limited only by the scope of the attached claims, including the full range of equivalency to which each element thereof is entitled.

I claim:

1. Apparatus for heating fuel for an engine having a fluid medium circulating system and a fuel delivery system, the apparatus comprising:

chamber means for receiving fluid medium from said engine;

manifold means disposed within said chamber means for introduction of fluid medium from said engine into said chamber means;

connection means for connecting said manifold means and said chamber means to said fluid medium circulating system for said engine;

heat exchanger means disposed in said chamber means for controlling fuel flow through said chamber means; and connection means for connecting said heat exchanger means to said fuel delivery system for said engine; said manifold means including a plurality of openings wherein at least one opening of said plurality of openings opens in a different direction than at least one other opening of said plurality of openings and said heat exchanger means extends around said manifold means, whereby introduction of fluid medium from said engine into said chamber means by said manifold means occurs in multiple directions thereby creating a generally uniform turbulence in fluid medium contained within said chamber means thereby improving transfer of heat from said fluid medium to said fuel.

2. Apparatus as set forth in claim 1 wherein said chamber means is generally elongated with closed ends and said manifold means extends generally along a longitudinal axis of said chamber means.

3. Apparatus as set forth in claim 2 wherein said heat exchanger means is generally tubular and coiled in a generally helical configuration, said coiled tubular heat exchanger means being disposed around said manifold means.

4. Apparatus as set forth in claim 3 wherein said plurality of openings in said manifold means includes at least three openings, each of said three openings opening in different directions and being of predetermined sizes such that there is a predetermined flow rate for fluid medium exiting said manifold means to thereby create a predetermined amount of moderate turbulence in fluid medium within said chamber means.

5. Apparatus as set forth in claim 4 wherein said manifold means extends substantially the length of said coiled heat exchanger means.

6. Apparatus as set forth in claim 5 wherein each opening of said plurality of openings is a slot and fluid medium exits said manifold means through said slots with sufficient velocity to thereby create nonlaminar flow of said fluid medium exiting said manifold means and moderate turbulence in fluid medium within said chamber means.

7. Apparatus as set forth in claim 6 wherein said chamber means includes a discrete fuel mixing reservoir for receiving and mixing fuel exiting from the heat exchanger means.

8. Apparatus as set forth in claim 7 wherein said heat exchanger means includes an inlet end extending through a wall of said chamber means and an outlet end extending through a wall defining said fuel mixing reservoir, said fuel mixing reservoir including an outlet extending outwardly from said chamber means, said inlet end of said heat exchanger means and said reservoir outlet extending outwardly of said chamber means to facilitate connection of said second mentioned connection means.

9. Apparatus as set forth in claim 8 including a fluid medium mixing reservoir for mixing fluid medium prior to said fluid medium exiting said apparatus.

10. Apparatus as set forth in claim 9 wherein said fluid medium flows generally counter to a direction of flow of fuel through said apparatus, said fluid medium mixing reservoir being disposed proximate a first end of said chamber means and said fuel mixing reservoir being disposed proximate a second end of said chamber means.

11. Apparatus as set forth in claim 10 wherein said chamber means is generally a cylinder with a first wall closing said first end and a second wall closing said second end, said fluid medium mixing reservoir being defined by a separate wall including an opening therein spaced from said first wall at said first end of said cylinder and said fuel mixing reservoir being defined by a division wall spaced from said wall at said second end of said cylinder, said heat exchanger means including an inlet end extending through the first wall at said first end of said cylinder and an outlet end extending through said division wall spaced from said second end, said fuel mixing reservoir being sealed relative to an area within said cylinder defined by said first wall and said division wall.

12. Apparatus as set forth in claim 11 wherein said heat exchanger is a tubular coil, said tubular coil being located at a ratio of 0.5 to 0.75 times an outside diameter of tube of which the tubular coil is formed from an inside surface of said chamber means and said tubular coil being located at a ratio of 1.65 to 2.00 times said outside diameter of said tube of which said tubular coil is formed from an outside surface of said manifold means, and adjacent coils of said tubular coil being located laterally apart from each other at a ratio of 0.375 to 0.500 times said outside diameter of said tube used to form said tubular coil.

13. Apparatus as set forth in claim 12 wherein said second mentioned connection means connects said manifold means and said chamber means, by way of said fluid medium reservoir, to a cooling system for said engine.

14. Apparatus as set forth in claim 12 wherein said second mentioned connection means connects said manifold means and said chamber means, by way of said fluid medium reservoir, to a lubricating system for said engine.

15. Apparatus as set forth in claim 12 including an electric immersion heater in said chamber means for heating said fluid medium when engine temperatures are insufficient to heat said fluid medium to predetermined temperatures.

16. Apparatus as set forth in claim 15 including control means including a valve for controlling fluid medium flow through said chamber means relative to sensed temperatures, said control means including sensors in said fluid medium reservoir and in said fuel mixing reservoir for measuring temperatures of fuel and fluid medium in each respective reservoir, whereby fuel passing through said heat exchanger means to said engine is heated by the transfer of heat from heated fluid medium thereby optimizing: fluidity of the fuel to ensure movement of the fuel through the fuel delivery system for the engine; vaporization of the fuel just prior to combustion of the fuel in the engine; and combustion of the fuel in the engine to minimize exhaust emissions.

17. Apparatus as set forth in claim 16 wherein said electric immersion heater includes a heater capable of using battery power and household electrical power as the electrical source, said immersion heater being disposed in said manifold means.

18. Apparatus as set forth in claim 3 including circulating means for circulating fuel and fluid medium through said apparatus, said circulating means including a pump in a fuel line from said fuel distribution system and a pump in a line from said cooling system, whereby said apparatus can be used to maintain elevated temperatures of fluid medium in said engine and elevated temperatures of fuel in said fuel delivery system.

19. Apparatus as set forth in claim 17 including circulating means for circulating fuel and fluid medium through said apparatus, said circulating means including a pump in a fuel line from said fuel distribution system and a pump in a line from said cooling system, whereby said apparatus can be used to maintain elevated temperatures of fluid medium in said engine and elevated temperatures of fuel in said fuel delivery system.

20. Apparatus for heating fuel for an engine having a fluid medium circulating system and a fuel delivery system, the apparatus comprising:
chamber means for receiving fluid medium from said engine, said chamber means including a discrete fuel mixing reservoir for receiving and mixing fuel exiting from the heat exchanger means;
manifold means disposed within said chamber means for introduction of fluid medium from said engine into said chamber means;
connection means for connecting said manifold means and said chamber means to said fluid medium circulating system for said engine;
heat exchanger means disposed in said chamber means for controlling fuel flow through said chamber means; and
connection means for connecting said heat exchanger means to said fuel delivery system for said engine;
said manifold means including a plurality of openings wherein at least one opening of said plurality of openings opens in a different direction than at least one other opening of said plurality of openings, whereby introduction of fluid medium from said engine into said chamber means by said manifold means occurs in multiple directions thereby creating a generally uniform turbulence in fluid medium contained within said chamber means thereby improving transfer of heat from said fluid medium to said fuel.

21. Apparatus as set forth in claim 20 wherein said heat exchanger means is generally tubular and coiled in a generally helical configuration.

22. Apparatus as set forth in claim 21 wherein said heat exchanger means includes an inlet end extending through a wall of said chamber means and an outlet end extending through a wall defining said fuel mixing reservoir, said fuel mixing reservoir including an outlet extending outwardly from said chamber means, said inlet end of said heat exchanger means and said reservoir outlet extending outwardly of said chamber means to facilitate connection of said second mentioned connection means.

23. Apparatus as set forth in claim 22 including a fluid medium mixing reservoir for mixing fluid medium prior to said fluid medium exiting said apparatus.

24. Apparatus for heating fuel for an engine having a fluid medium circulating system and a fuel delivery system, the apparatus comprising:
chamber means for receiving fluid medium from said engine;
manifold means disposed within said chamber means for introduction of fluid medium from said engine into said chamber means;
connection means for connecting said manifold means and said chamber means to said fluid medium circulating system for said engine;

heat exchanger means disposed in said chamber means for controlling fuel flow through said chamber means;

connection means for connecting said heat exchanger means to said fuel delivery system for said engine;

said manifold means including a plurality of openings wherein at least one opening of said plurality of openings opens in a different direction than at least one other opening of said plurality of openings, whereby introduction of fluid medium from said engine into said chamber means by said manifold means occurs in multiple directions thereby creating a generally uniform turbulence in fluid medium contained within said chamber means thereby improving transfer of heat from said fluid medium to said fuel; and said chamber means including a discrete fuel mixing reservoir for receiving and mixing fuel exiting from the heat exchanger means and a fluid medium mixing reservoir for mixing fluid medium prior to said fluid medium exiting said apparatus, and control means including a valve for controlling fluid medium flow through said chamber means relative to sensed temperatures of fuel in said fuel mixing reservoir, whereby fuel passing through said heat exchanger means to said engine is heated by the transfer of heat from heated fluid medium in said chamber means thereby optimizing: the fluidity of the fuel to ensure movement of the fuel through the fuel delivery system for the engine; the vaporization of the fuel just prior to combustion of the fuel in the engine to more completely vaporize the fuel; and the combustion of the fuel in the engine to minimize exhaust emissions.

25. Apparatus for heating fuel comprising:
chamber means for containing fluid medium therein;
heat source means for heating said fluid medium;
heat exchanger means disposed within said chamber means for controlling fuel flow through said chamber means;
connection means for connecting said heat exchanger means to a fuel delivery system;
discrete fuel mixing reservoir means disposed proximate an end of said heat exchanger means for blending fuel exiting from said heat exchanger means, and
control means for controlling temperature of said fluid medium in said chamber means, said control means including sensor means for sensing temperature of fuel in said fuel mixing reservoir, wherein said control means for controlling the temperature of said fluid medium in said chamber means includes controlling energizing of said heat source means and said sensor means includes a sensor in said fuel mixing reservoir means.

26. Apparatus as set forth in claim 25 wherein said heat source means includes an electric immersion heater in said manifold means.

27. Apparatus as set forth in claim 25 wherein said heat source means includes an electric immersion heater in said chamber means.

28. Apparatus as set forth in claim 27 wherein said heat source means includes an engine having a fluid medium circulating system, connection means for connecting said chamber means to said fluid circulating system, said chamber means includes a mixing reservoir for mixing fluid medium prior to said fluid medium exiting said apparatus, said control means including sensors in said fuel reservoir means and said fluid medium reservoir and means for comparing said temperatures and controlling flow rate of fluid medium through said chamber means.

29. Apparatus as set forth in claim 26 wherein said manifold means extends substantially the length of said tubular coil, each opening of said plurality of openings in said manifold means is a slot, and wherein said tubular coil is located at a ratio of 0.5 to 0.75 times an outside diameter of tube of which the tubular coil is formed from an inside surface of said chamber means and said tubular coil is located at a ratio of 1.65 to 2.00 times said outside diameter of said tube from an outside surface of said manifold means, and each coil of said tubular coil being located laterally apart from each other coil at a ratio of 0.375 to 0.500 times an outside diameter of said tube used to form tubular coil.

30. Apparatus as set forth in claim 26 wherein said electric immersion heater can selectively use battery power and household electrical power as an electrical source.

31. Apparatus as set forth in claim 29 including circulating means for circulating fuel and fluid medium through said apparatus, said circulating means including a pump in a fuel line from a fuel distribution system for the engine and a pump in a line from said fluid medium circulating system for the engine, whereby fuel passing through said heat exchanger means to said engine can be heated by the transfer of heat from heated fluid medium from the engine thereby optimizing: the fluidity of the fuel to ensure movement of the fuel through a fuel delivery system for the engine; the vaporization of the fuel just prior to combustion of the fuel in the engine to more completely vaporize the fuel; and the combustion of the fuel in the engine to minimize exhaust emissions.

32. Apparatus for heating fuel comprising:
chamber means for containing fluid medium therein;
heat source means for heating said fluid medium;
heat exchanger means disposed within said chamber means for controlling fuel flow through said chamber means;
connection means for connecting said heat exchanger means to a fuel delivery system; and
discrete fuel mixing reservoir means disposed proximate an end of said heat exchanger means for blending fuel exiting from said heat exchanger means;
said heat source means including an engine having a fluid medium circulating system, connection means for connecting said chamber means to said fluid circulating system, said chamber means includes a mixing reservoir for mixing fluid medium prior to said fluid medium exiting said apparatus, said control means including sensors in said fuel reservoir means and said fluid medium reservoir and means for comparing said temperatures and controlling flow rate of fluid medium through said chamber means.

33. Apparatus as set forth in claim 32 wherein said chamber means is generally cylindrical with closed ends and includes manifold means extending generally along a longitudinal axis of said chamber means for the introduction of fluid medium into said chamber means, said heat exchanger means including a tubular coil coiled in a generally helical configuration and disposed around said manifold means, a plurality of openings in said manifold means including at least three openings, whereby each of said three openings open in different directions and each opening forms an outlet of a predetermined size to thereby provide a predetermined flow rate for fluid medium exiting said manifold means to thereby create a moderate turbulence in fluid medium within said chamber means.

* * * * *